US 6,701,272 B2

(12) United States Patent
Cooper et al.

(10) Patent No.: US 6,701,272 B2
(45) Date of Patent: Mar. 2, 2004

(54) METHOD AND APPARATUS FOR OPTIMIZING THERMAL SOLUTIONS

(75) Inventors: Barnes Cooper, Beaverton, OR (US); David A. Wyatt, San Jose, CA (US); Terry M. Fletcher, Sacramento, CA (US); Matt King, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/820,863

(22) Filed: Mar. 30, 2001

(65) Prior Publication Data

US 2002/0143488 A1 Oct. 3, 2002

(51) Int. Cl.[7] .............................................. G05D 23/00
(52) U.S. Cl. ........................ 702/132; 702/130; 702/131
(58) Field of Search ................................. 702/130, 131, 702/132, 136; 700/153, 299; 710/36; 711/100; 713/300

(56) References Cited

U.S. PATENT DOCUMENTS

| 5,760,636 A | 6/1998 | Noble et al. ................. 325/513 |
| 5,838,987 A | 11/1998 | Brightman .................... 712/32 |
| 6,105,142 A | 8/2000 | Goff et al. .................... 713/324 |
| 6,173,217 B1 * | 1/2001 | Bogin et al. ................. 700/299 |
| 6,182,238 B1 | 1/2001 | Cooper .......................... 714/2 |

OTHER PUBLICATIONS

Sanchez et al., "Thermal Management System for High Performance PowerPC™ Microprocessors", COMPCON 1997 Proceedings IEEE, Feb. 23, 1997, pp. 325–330.

* cited by examiner

*Primary Examiner*—Kamini Shah
(74) *Attorney, Agent, or Firm*—Kenyon & Kenyon (57) ABSTRACT

A method and apparatus are provided for obtaining throttle settings of a system, such as a chipset. A first bandwidth may be applied to a first area (or interface) of the system and a temperature of the first area may be sensed using a thermal sensor. The bandwidth passing through this first area may be increased or decreased based on the sensed temperature to obtain an ideal or optimized setting.

38 Claims, 9 Drawing Sheets

METHOD AND APPARATUS FOR OPTIMIZING THERMAL SOLUTIONS

FIELD

The present invention is directed to throttle settings for a chipset. More particularly, the present invention is directed to optimizing throttle settings based on detected temperatures.

BACKGROUND

Chipsets contain interfaces to couple with components external to the chipset. The chipsets also include internal interfaces between respective logical components. During operation, these interfaces generate heat as bandwidth traverses through the respective interfaces and along the signal lines. The temperature may rise to a level that causes problems during operation of the chipset. As more current travels through an interface, more heat may be generated that may affect components and interfaces of the chipset.

Heat sinks, air flows or combinations of heat sinks and air flows may be used as thermal solutions to keep silicon of the chipset from exceeding its junction temperature specification. More recent chipsets may include a mechanism (i.e., throttling) for limiting a maximum sustainable power by lowering a clock-frequency/duty-cycle and/or limiting the maximum sustainable bandwidth. Analysis and estimations show that realistic applications may not sustain high power consuming bandwidths. The throttle values may be fixed values and allow the speculated worse-case-realistic-application to achieve the bandwidths it could generate while not allowing artificially crafted malicious applications to sustain higher bandwidths. These thermal solutions may no longer be sufficient as the worse-case-realistic-application power may be close to highest achievable power and also consume near-maximum bandwidths. Therefore, a set of fixed throttle values to cover the most extreme cases may visibly hinder the performance of parts even in an environment that never sees such extreme thermal conditions.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

The following represents brief descriptions of the drawings wherein like reference numerals represent like elements and wherein.

DETAILED DESCRIPTION

In the following discussion, like reference numerals and characters may be used to designate identical, corresponding or similar components in differing figure drawings. Further, in the detailed description to follow, example sizes/models/values/ranges may be given although the present invention is not limited to the same. Further, the clock and timing signal FIGS. are not drawn to scale. Arrangements may also be shown in block diagram form in order to avoid obscuring the invention, and also in view of the fact that specifics with respect to implementation of such block diagram arrangements may be highly dependent upon the platform within which the present invention is to be implemented. That is, such specifics should be well within the purview of one skilled in the art. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions may be used to implement embodiments of the present invention.

Further, any reference in the specification to "one embodiment", "an embodiment", "example embodiment", etc., is intended to mean that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other embodiments.

Figure 1:
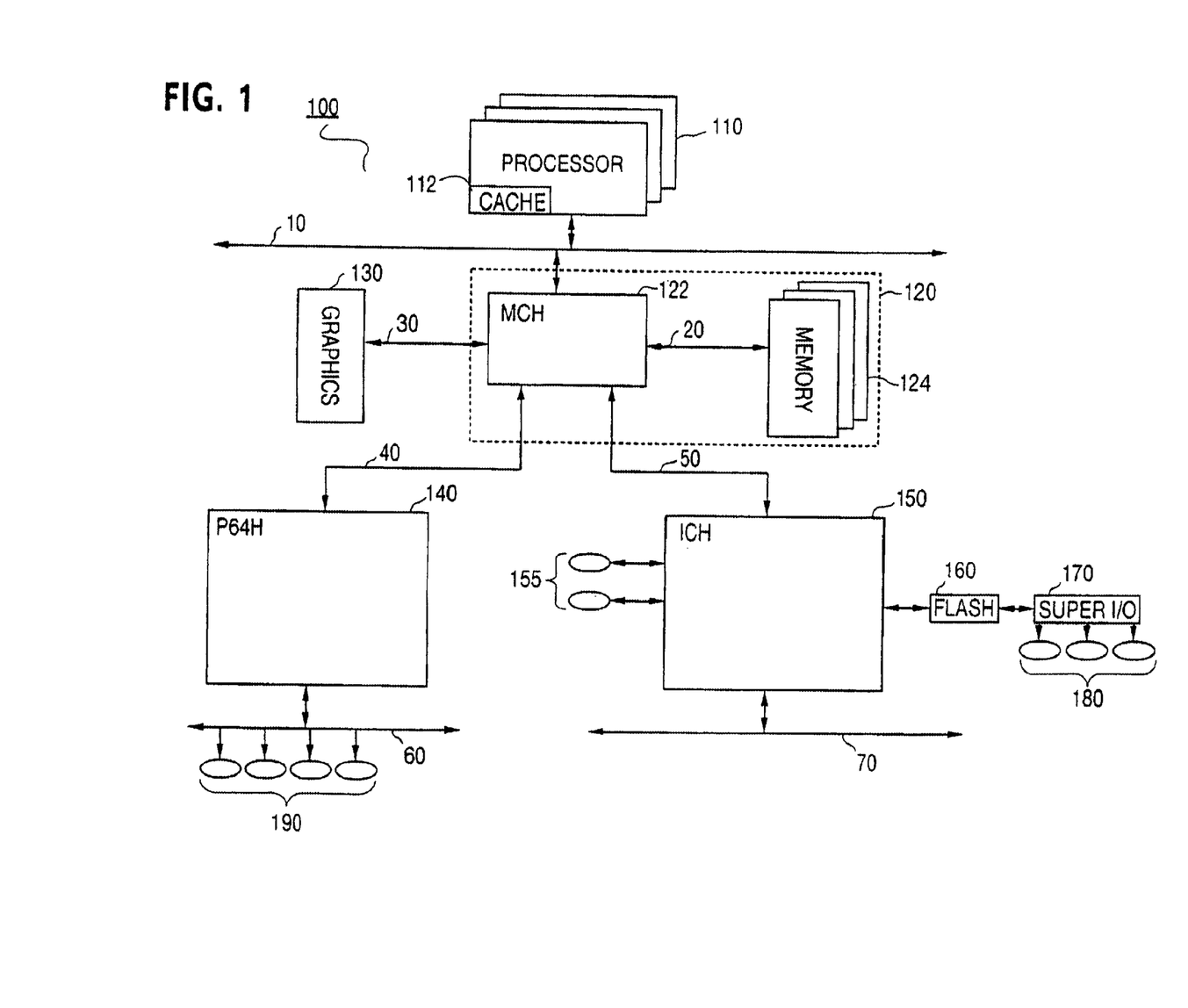
FIG. 1 is an example computer system platform.

FIG. 1 shows an example computer system platform. As shown in FIG. 1, the computer system 100 may include a processor subsystem 110, a memory subsystem 120 coupled to the processor subsystem 110 by a front side bus 10, graphics 130 coupled to the memory subsystem 120 by a graphics bus 30, one or more host chipsets 140–150 coupled to the memory subsystem 120 by hub links 40 and 50 for providing an interface with peripheral buses such as Peripheral Component Interconnect (PCI) buses 60 and 70 of different bandwidths and operating speeds, a flash memory 160, and a super I/O 170 coupled to the chipset 150 by a low pin count (LPC) bus for providing an interface with a plurality of I/O devices 180 such as a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. A plurality of I/O devices 190 may be provided along the non-legacy PCI bus 60. The computer system 100 may be configured differently or employ some or different components than those shown in FIG. 1.

The processor subsystem 110 may include a plurality of host processors and a cache subsystem 112. The memory subsystem 120 may include a memory controller hub (MCH) 122 coupled to the host processors by a front side bus 10 (i.e., host or processor bus) and at least one memory element 124 coupled to the MCH 122 by a memory bus 20. The memory element 124 may be a dynamic random-access-memory (DRAM), or may be a read-only-memory (ROM), video random-access-memory (VRAM) and the like. The memory element 124 stores information and instructions for use by the host processors. The graphics 130 may be coupled to the main controller hub 122 of the memory subsystem 120 by the graphics bus 30, and may include, for example, a graphics controller, a local memory and a display device (e.g., cathode ray tube, liquid crystal display, flat panel display, etc.)

The host chipsets 140 and 150 may be Peripheral Component Interconnect (PCI) bridges (e.g., host, PCI—PCI, or standard expansion bridges) in the form of PCI chips such as, for example, the PIIX4® chip and PIIX6® chip manufactured by Intel Corporation. In particular, the chipsets 140 and 150 may correspond to a Peripheral Component Interconnect (PCI) 64-bit hub (P64H) 140 and an input/output controller hub (ICH) 150. The P64H 140 and the ICH 150 may be coupled to the MCH 122 of the memory subsystem 120 respectively by 16 bits and 8 bits hub links 40 and 50, for example, and may operate as an interface between the front side bus 10 and peripheral buses 60 and 70 such as PCI buses of different bandwidths and operating speeds. The PCI buses may be high performance 32 or 64 bit synchronous buses with automatic configurability and multiplexed address, control and data lines as described in the latest version of "PCI Local Bus Specification, Revision 2.2" set forth by the PCI Special Interest Group (SIG) on Dec. 18, 1998 for add-on arrangements (e.g., expansion cards) with new video, networking, or disk memory storage capabilities. For example, the PCI bus 60 of 64-bits and 66 MHz may connect to the P64H 140. Similarly, the PCI bus 70 of 32-bits and 33 MHz may connect to the ICH 150. Other types of bus architectures such as Industry Standard Architecture (ISA) and Expanded Industry Standard Architecture (EISA) buses may also be utilized.

The hub links 40 and 50 that couple the P64H 140 and the ICH 150 to the MCH 122 of the memory subsystem 120 may be primary PCI buses of different bandwidths and operating speeds. The peripheral buses 60 and 70 that connect the P64H 140 and the ICH 150 to I/O devices may be secondary PCI buses of different bandwidths and operating to speeds. The P64H 140 and ICH 150 may correspond to PCI—PCI bridges designed for compliance with the "PCI Local Bus Specification, Revision 2.2" set forth by the PCI Special Interest Group (SIG) on Dec. 18, 1998, and the "PCI Bus Power Interface (ACPI) and Power Management Interface Specification, Revision 1.1" set forth by the PCI Special Interest Group (SIG) on Jun. 30, 1997.

Figure 2:
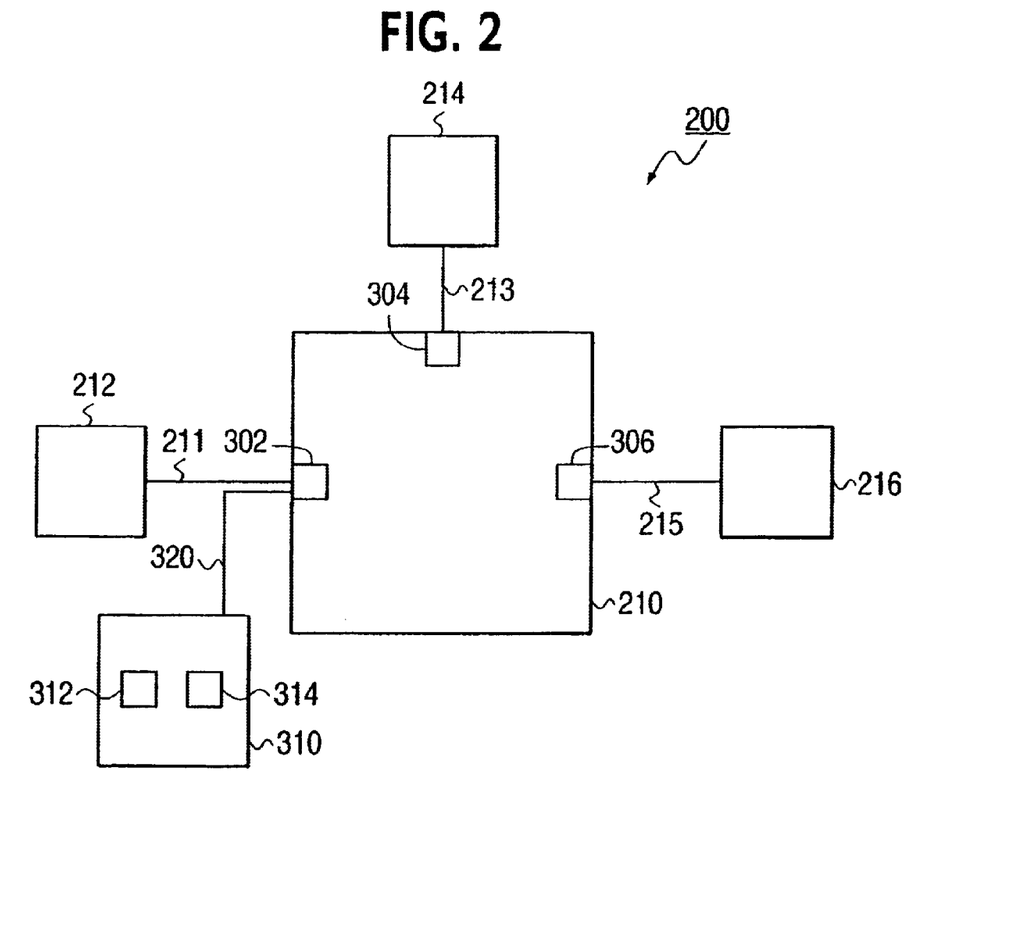
FIG. 2 is a block diagram of an example embodiment of the present invention.

FIG. 2 is a block diagram of an example embodiment of the present invention. Other embodiments and configurations are also within the scope of the present invention. In particular, FIG. 2 shows a computer system 200 similar to the platform shown in the FIG. 1 embodiment. However, for ease of illustration, only several components of the computer system 200 are shown in FIG. 2. The computer system 200 may include a chipset 210 that may be a memory control hub or an integrated graphics memory control hub, for example. Embodiments of the present invention are not limited to a chipset. That is, the block corresponding to the chipset 210 may be any type of system containing logical components.

The chipset 210 may be coupled to a first component 212 by a first signal line 211. The chipset 210 may be coupled to a second component 214 by a second signal line 213. Additionally, the chipset 210 may be coupled to a third component 216 by a signal line 215. For ease of illustration, only three exterior components are shown although the present invention is not limited to this number of components or to these connections. As is well known, interface devices (or mechanisms) may be provided on the chipset 210 (or exterior to the chipset 210) to provide interfaces between the chipset 210 and each of the signal lines 211, 213 and 215. The chipset 210 may include internal interface devices (or components or mechanisms) between logical components within an interior of the chipset 210. However, for ease of illustration, embodiments of the present invention will be described with respect to interfaces that couple the chipset 210 to exterior components such as that shown in FIG. 2.

The chipset 210 may be a memory control hub that includes functional units such as a system memory controller, a local memory controller and an integrated graphics controller. Mechanisms may be provided for throttle controls of the functional units or on the interfaces of those units.

Embodiments of the present invention may include a testing apparatus 310 to couple to the chipset 210. The testing apparatus 310 may include a bandwidth generating control device 312 and a processor device 314 as will be described below. The bandwidth generating control device 312 and the processor device 314 are shown in two boxes although the functions of these boxes may be performed by a single functional unit such as the processor device 314. Embodiments of the present invention may also provide a first thermal sensor 302 in a first area of the chipset 210, a second thermal sensor 304 in a second area of the chipset 210 and a third thermal sensor 306 in a third area of the chipset 210. The first, second and third areas of the chipset 210 may correspond to a location of an interface between the chipset 210 and the signal lines 211, 213 and 215, respectively. Each of the thermal sensors 302, 304 and 306 may be coupled to the testing apparatus 310 by a signal line or similar type of communication mechanism. For ease of illustration, only one signal line, namely a signal line 320, is shown coupled between the testing apparatus 310 and the first thermal sensor 302.

The first thermal sensor 302 may be a temperature sensor (i.e., thermal diode) having a digital to analog converter (DAC) to provide selection of a trip point reference. Embodiments of the present invention may include a programmable storage device (such as a diskette or similar type of device to store software programs, routines and/or utilities) that may be loaded within the testing apparatus 310 to provide various mechanisms and methodologies as will be described below. This may include power profiling of the various interfaces of the chipset 210. The software may be capable of running in a Windows environment, for example. A graphical user interface (GUI) may be provided on the testing apparatus 310 for inputting information and receiving information. The user may have the option of selecting any custom read and/or write bandwidth in MB/s from zero to a calibrated maximum of the system. The software utilities may include a bandwidth saturation stress test routine/program, a routine/program to monitor and log the temperature response of the chipset/product/platform, a routine/program to analyze and compute optimal settings and a routine/program to run the test tools and compile the results. The bandwidth saturation stress test routine/program may take the input of the bandwidth saturation levels and log the results for exercising the various interfaces in the platform such as: between the processor subsystem 110 and the chipset 210, between the chipset 210 and memory buses, within the chipset 210, and between the chipset 210 and peripherals.

In accordance with embodiments of the present invention, a software management tool may aid in determining optimal chipset bandwidth throttle settings that will ensure safe temperature operating conditions and optimize performance of the chipset 210. The utility may initiate an automated thermal profiling test that will stress the processor unit to main memory bus while monitoring the sensor temperature of the chipset 210, for example. It may determine the maximum processor unit to main memory transfer rate or bandwidth (MB/sec) that will be allowable in order to maintain a desired goal sensor temperature that may be established by the system designer. Based on the test results, the utility may provide recommended throttle settings that may be used by a BIOS engineer to program into the chipset throttle registers.

The bandwidth generating control device 312 may control a bandwidth applied to the first area of the chipset 210. More specifically, the bandwidth generating control device 312 may operate in conjunction with the processor device 314 to generate an amount of bandwidth to flow through an interface located within the first area of the chipset 210. The actual bandwidth may be produced by a bandwidth generating mechanism that is exterior to the testing device 310. The bandwidth generating control device 312 may control this mechanism and allow various types of bandwidth to pass through the first area of the chipset 210. Similarly, the bandwidth generating control device 312 may operate in conjunction with the processor device 314 to control a bandwidth that passes through the second area of the chipset 210 and a bandwidth that passes through the third area of the chipset 210. The bandwidth passing through each of the areas of the chipset 210 may be different or similar to one another. Additionally, the bandwidths may pass through each of the areas of the chipset 210 either simultaneously or at different times.

The testing apparatus 310 may determine a sensed temperature of the first area of the chipset 210 using the first thermal sensor 302. Similarly, the testing apparatus 310 may determine the sensed temperature of the second area of the chipset 210 using the second thermal sensor 304 and may determine the sensed temperature of the third area of the chipset 210 using the third thermal sensor 306. As will be described below, the testing apparatus 310 may monitor the sensed temperatures and appropriately adjust (increase or decrease) the bandwidth applied to the respective areas of the chipset 210 based on the sensed temperatures. The testing apparatus 310 may monitor the sensed temperatures and determine an ideal or optimized throttle setting for the bandwidth that passes through each of the respective areas based on the sensed temperature with relation to a predetermined temperature (such as a maximum temperature or a maximum junction temperature of the chipset). Monitoring of the sensed temperatures to each of the respective areas may be done individually so as to obtain the optimized throttle settings. On the other hand, monitoring may also be done simultaneously for each of the areas. The testing apparatus 310 may monitor sensed temperatures and appropriately adjust the throttle settings such that each of the areas has a temperature below the predetermined temperature for that respective area. After monitoring, the testing apparatus 310 may determine the optimized throttle settings based on the bandwidth passing through each of the respective areas at that time. The software application may determine the recommended throttle settings that may be provided to the BIOS engineer, which may thereafter be used to program the respective throttle registers. The optimized throttle settings may therefore be programed into respective registers or control programs of the chipset 210 for future reference during operation. This procedure may be performed prior to the initial operation of the chipset 210 in its respective platform. The throttle settings may thereafter remain as they have been optimized based on the ideal bandwidth to pass through each of the areas on the chipset 210.

The testing apparatus 310 may include a monitoring system that monitors the sensed temperature of the first thermal sensor 302 while the bandwidth is passing through the first area. The monitoring system may operate in cooperation with the other systems to increase the bandwidth if the sensed temperature is below the predetermined temperature or to decrease the bandwidth if the sensed temperature is above the predetermined temperature. As will be described below, the monitoring system may include an error detection mechanism to detect a difference of the sensed temperature from an ideal temperature and to produce an error signal. A feedback mechanism within the testing apparatus 310 may adjust the bandwidth based on the magnitude of the error signal.

The algorithm may monitor feedback from an on-die thermal sensor while running power utility applications. This methodology may use power-profiling utilities and graphics stress software to determine maximum bandwidths (i.e., power levels) and correlating them to maximum allowable die temperatures. If the maximum die temperature is reached using the stress utilities, a throttle register setting may be recommended and displayed.

Embodiments of the present invention will now be described with more specific details. These are merely examples of embodiments as other embodiments are also within the scope of the present invention.

Power profiling software may be used to create high power conditions for various functional interfaces of the chipset 210. By using this power profiling software, the testing apparatus 310 may determine throttle settings based on the detected die temperature while under stress conditions. Stress applications may measure the die temperature changes over finite time intervals (or sampling periods) for calculating thermal constants. The thermal time constants may be used in a dynamic feedback mode of the on-die thermal sensor (i.e., the first thermal sensor 302) where the throttling responds in real-time to die level power densities and local die temperature monitoring. A graphical user interface (GUI) may be provided on the testing apparatus 310 for inputting information and receiving information.

Embodiments of the present invention will now be described with respect to the flowcharts shown in FIGS. 3–5. These flowcharts are merely exemplary as other embodiments, flowchart and operations are also within the scope of the present invention. That is, these flowcharts are not limiting of the present invention. Additionally, these flowcharts relate to interfaces between a processor unit and local memory, system memory and a graphics controller. These are merely exemplary as other interfaces and interconnections are also within the scope of the present invention.

Figure 3:
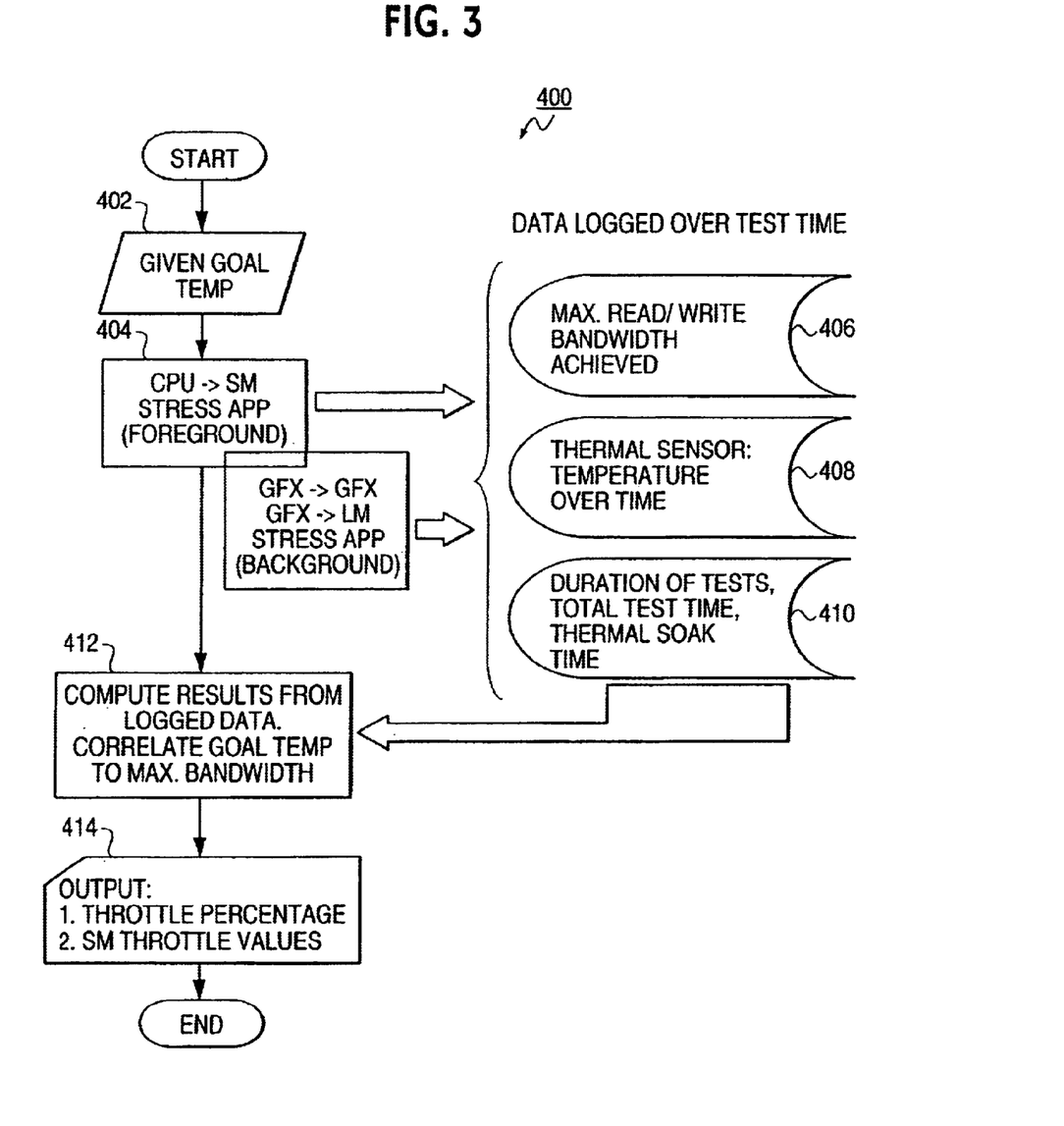
FIG. 3 is a flowchart of an example embodiment of the present invention.

In FIG. 3, a stress application test is run from a processor unit to a main memory. The stress application may include an algorithm that iterates the bandwidth (low bandwidth to the maximum bandwidth) in an unthrottled environment. This algorithm may step through workloads while monitoring the die temperature using the thermal sensor in order to calculate the maximum bandwidth condition corresponding to the maximum temperature goal point. In this embodiment, a low-level graphics application (such as a graphics controller to graphics controller and/or a graphics controller to local memory) may also be running. The graphics application may produce a sustainable high bandwidth workload that does not consume the additional processor unit to memory bandwidth. Furthermore, once the correlation of bandwidth to the maximum die temperature has been found, a recommended throttle percentage value (or actual bandwidth) may be displayed on the testing apparatus 310 along with the actual memory write throttle register value to be programmed into the chipset 210.

More specifically, FIG. 3 shows a flowchart 400 in which a given goal temperature is provided in block 402. In block 404, the stress application may be performed on the processor unit to the system memory interface while other applications, such as the graphics controller to graphics controller and/or graphics controller to local memory, are also running. The bandwidth may be increased or decreased over time until attaining a temperature just below (or at) the predetermined temperature, for example. The respective data may be logged over the entire test time. This data may include, for example: the maximum read/write bandwidth achieved (block 406), the temperature over time of the thermal sensor (block 408) and the duration of the test, the total test time, and the thermal sense time (block 410). In block 412, the results may be computed from the logged data and the goal temperature may be correlated to the maximum bandwidth. In block 414, the throttle percentage and/or the throttle values may be displayed (or output) on the testing apparatus 310. The methodology shown by the flowchart of FIG. 3 monitors the temperature in the area of the processor unit and system memory interface to determine the appropriate throttle percentage by using the sensed temperature and the predetermined maximum temperature.

Figure 4:
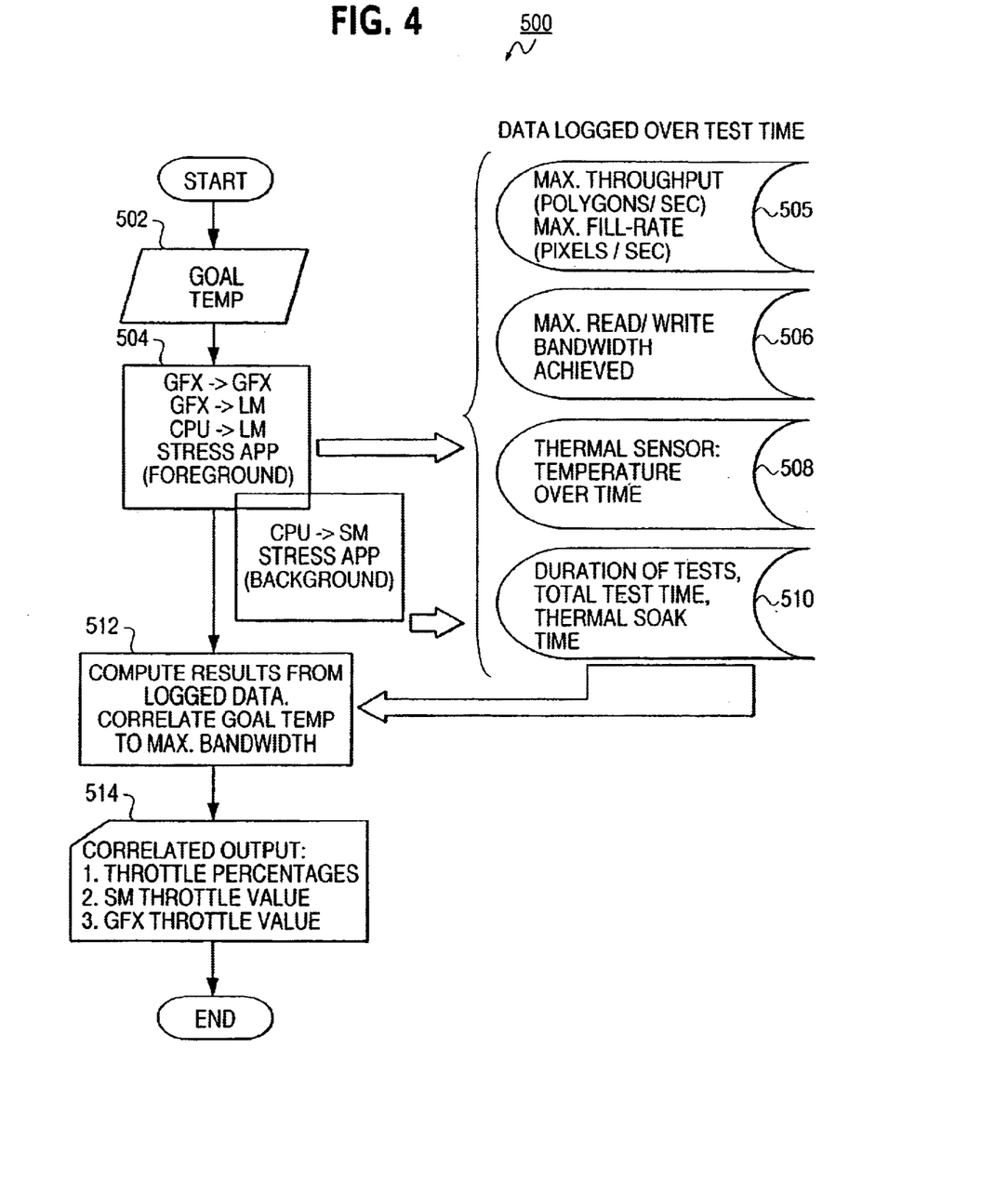
FIG. 4 is a flowchart of an example embodiment of the present invention.

FIG. 4 shows a flowchart 500 to run a graphics stress application. The stress application may be performed on a graphics to graphics interface, a graphics to local memory interface, and/or a processor unit to local memory interface. One stress application test may be running at a time or a plurality of application tests may be running concurrently while sampling the thermal sensor temperatures. In this embodiment, the processor unit to SDRAM stress application may also be running. A maximum temperature may be correlated to a maximum graphical bandwidth and the throttle registers may be determined. More particularly, FIG. 4 shows obtaining the goal temperature (block 502) from either the previously obtained goal temperature (from FIG. 3) or by reentry by the user. In block 504, the stress application test may be run on the graphics to graphics interface, the graphics to local memory interface, and the processor unit to local memory interface. As indicated above, in this embodiment the processor to system memory may also be running. In a similar manner to the FIG. 3 embodiment, the testing apparatus 310 may appropriately adjust the bandwidth applied through each of the respective interfaces in order to determine the bandwidth that maintains the sensed temperature below the predetermined temperature, for example. The respective data may be logged over the entire test time. This may include: the maximum throughput and the maximum fill rate (block 505), the maximum read/write bandwidth achieved (block 506), the thermal sensor readings such as the temperature over time (block 508) and the duration of the test, the total test time and the thermal soak time (blocks 510). The results may be computed from logged data (block 512) and the goal temperature may be correlated to the to maximum bandwidth. In block 514, the correlated output may be displayed such as the throttle settings and/or the throttle values.

Figure 5:
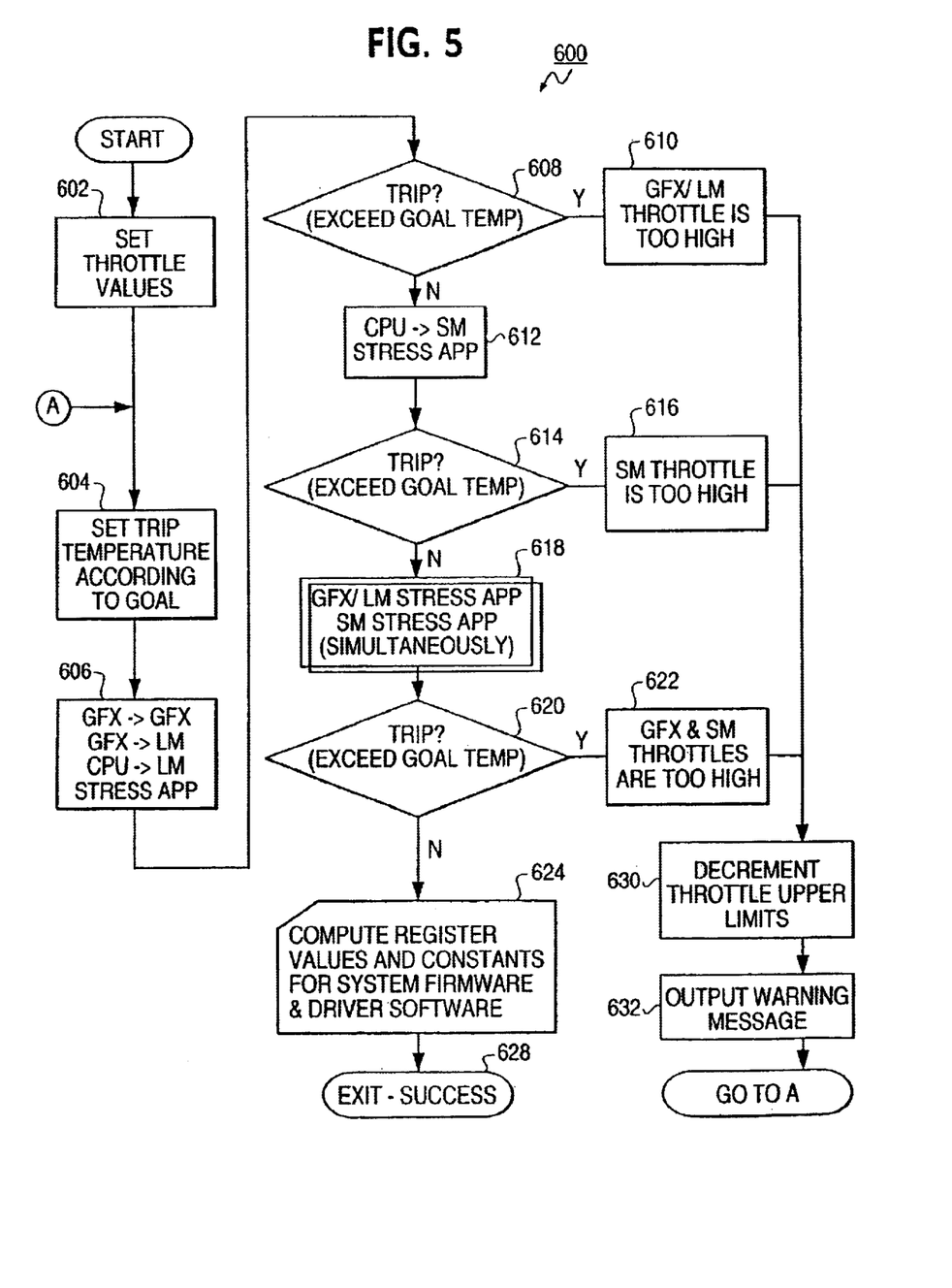
FIG. 5 is a flowchart of an example embodiment of the present invention.

FIG. 5 shows a flowchart 600 that involves a verification of the different throttle settings when each of the respective interfaces passes a maximum bandwidth. That is, the methodology of FIG. 5 tests the previously obtained throttle values to determine if they are appropriate when more than one interface has its ideal bandwidth passing therethrough. More specifically, the throttle values previously determined (from FIGS. 4 and 5) may be obtained in block 602. In block 604, the goal temperatures may be set. The temperatures may be obtained from the previously entered temperature or may be entered again. In block 606, the stress application may be performed on the graphics to graphics interface, the graphics to local memory interface and the processor to local memory interface. In block 608, the testing apparatus 310 determines whether the goal temperature has been exceeded based on the sensed temperatures of the thermal sensors. If the temperature has been exceeded, then the graphics to local memory throttle is too high (block 610). If the temperature has not been exceeded, then the stress application may be applied to the processor to system memory interface in block 612. In block 614, the testing apparatus 310 determines whether the sensed temperature of this interface exceeds the desired goal. If the sensed temperature exceeds the goal, then the system memory throttle is too high. If the sensed temperature does not exceed the goal, then the stress application may occur simultaneously on the graphics to local memory interface and the system memory interface (block 618). If the sensed temperatures at these interfaces exceeds the desired goal temperatures, then the graphics and system memory throttles are determined to be too high (block 622). On the other hand, if the sensed temperatures do not exceed the desired goal temperature, then the register values and the constants for the system firmware and driver software may be computed. If the throttles are determined to be too high in any of the blocks 610, 616 and 622, then these throttle values may be determined (block 630) and a warning message may be displayed on the testing apparatus 310 (block 632). In such a circumstance, the process may be repeated by returning to point A in FIG. 5 between block 602 and block 604.

Accordingly, embodiments of the present invention may utilize an on-die thermal diode temperature sensor for die temperature feedback as compared with an external package thermocouple. The diode sensor may be an accurate representation of local die temperatures and may be intrinsically more responsive to die temperature fluctuations. This type of feedback may be used by the software for instantaneous response to power densities.

Additionally, the software may utilize a graphical user interface (GUI) on the testing apparatus 310 with minimal customer input or direction. This method of running power applications and determining throttle settings may provide customers with an optimized and customized throttle solution and thermal management for specific system environments.

Figure 6:
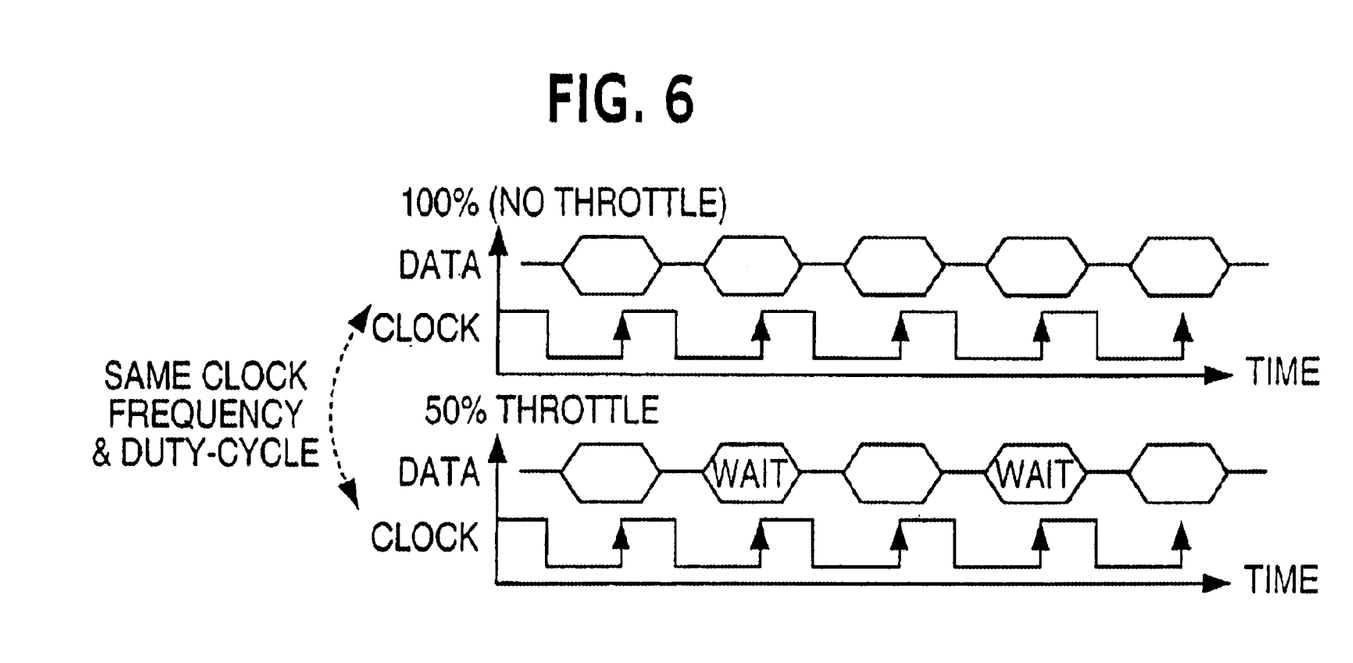
FIG. 6 is a timing diagram showing 100% and 50% throttling.

Various embodiments of throttling will now be described. Interface throttling may involve inserting a variable number of wait states into a functional unit's external and/or internal interfaces. Throttling an interface may be expressed as a percentage of a 100% maximum possible throughput. For example, FIG. 6 shows a timing diagram of clock and data for both a 100% throttle and a 50% throttle. Both timing diagrams have the same clock frequency and duty cycle. The 50% throttle includes alternating periods of wait states.

Clock throttling may involve the changing of the clock frequency or duty cycle to effect a reduction in power. Clock throttling may not be as effective when the use of aggressive clock-gating techniques is applied to a functional unit within an integrated controller. Clock frequency control and other techniques potentially may effect the entire chip whereas the majority of power-consumption (and heat generated) may only be caused by certain functional units or interfaces (such as the I/O buffers) within those units. Most of the power consumption may be centered in the I/O buffers of the specific unit interfaces such as the system memory controller, the local memory controller and may be decreasingly related to the internal clock tree.

Embodiments of the present invention may provide more than one method of power management control, namely a fixed mode (corresponding to a fixed model) and a dynamic mode (corresponding to a dynamic model).

In the fixed model, a fixed trip-point to throttle percentage amount provides that exceeding a preset point may affect the automatic throttling. The throttle percentages for each of the interfaces may be preset and the throttle may take effect immediately on exceeding a preset trip-point. The throttle may be removed when crossing back under the trip-point. In this model, exceeding a preset catastrophic (worse case) trip-point may cause a system shutdown to help prevent thermal mechanical failure. The presets may be locked through interface register bits to prevent subsequent alteration of the trip-points/throttles. In this model, the chipset may throttle to safe amounts that may protect against the worst case scenario. The performance may greatly oscillate from an unthrottled condition to a throttled condition.

On the other hand, in the dynamic mode or model, the dynamic controls of the throttles and the throttle amount may be based on the temperature. This mode may also include the preset trip-point and register bits as in the fixed mode. In the dynamic mode, crossing a hot-trip event may cause the software (or algorithm) to enter a reactive thermal control mode. The software (or algorithm) may dynamically adjust the throttling performance to match thermal constraints. The system may only throttle as much as necessary in order to preserve bandwidth for the remainder of the computer system.

Figure 7:
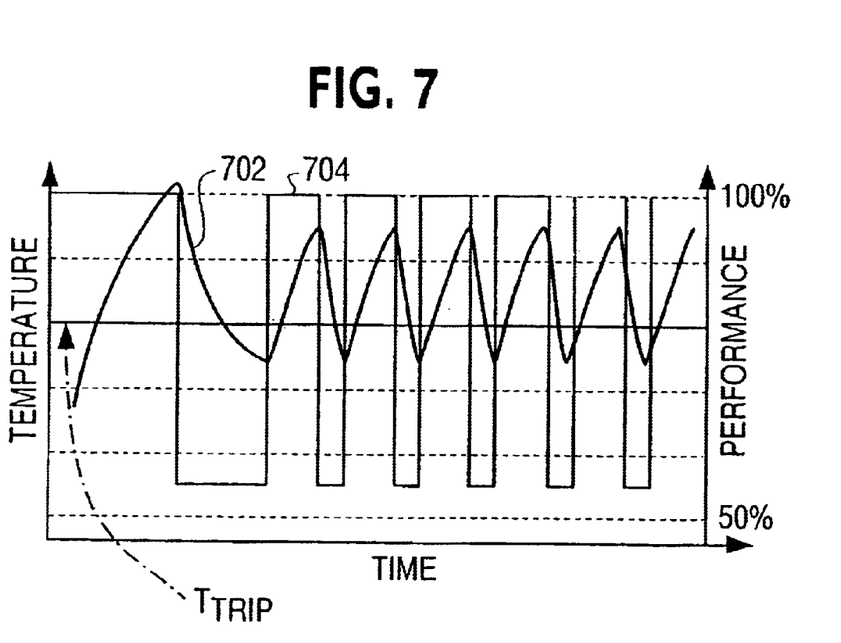
FIG. 7 is a timing diagram showing fixed throttling.

FIG. 7 shows the throttling in the fixed mode (or the fixed model). In this graph, T-trip represents the desired temperature and a line 702 represent the sensed temperature of a sensor, such as the thermal sensor 302. The curve 704 represents the throttling amount shown as a percentage of a 100% maximum possible throughput. The horizontal axis represents the time, such as the sampling time of the sensor.

Figure 8:
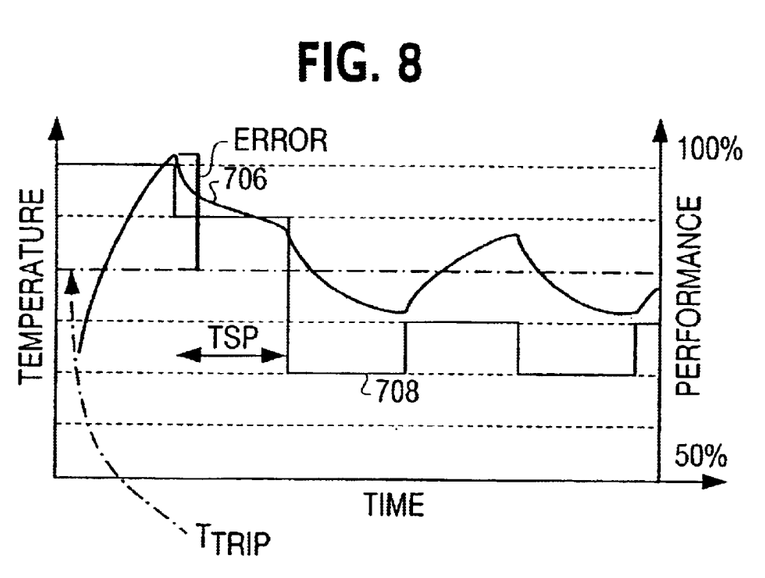
FIG. 8 is a timing diagram showing dynamic throttling according to an example embodiment of the present invention.

FIG. 8 shows the throttling in the dynamic mode in which the throttling performance may be dynamically adjusted to match thermal constraints. In this graph, T-trip represents the desired temperature and a line 706 represents the sensed temperature of a sensor, such as the thermal sensor 302. The curve 708 represent the throttling amount shown as a percentage of 100% maximum possible throughput. The horizontal axis represents the time, such as the sampling time of the sensor. In the dynamic mode, an error amount may be used to determine how much throttle to apply.

The dynamic mode has the following advantages. A dynamic mode may settle down quicker because it involves less overshoot and ringing. This may be shown in FIG. 8 by the narrower range of swing in the performance when being throttled. By having less overshoot, the performance may only be degraded as much as necessary given that it still has some overshoot. Furthermore, the dynamic mode only throttles the area that needs throttling (i.e., utilization feedback) by relying on performance counters and bandwidth trips, for example, to indicate which unit is under stress. If one units utilization is widely different than the rest, then that one may perportionately be throttled the most. If all the units utilization are roughly equal, then they all may be throttled in equal amounts. This may be referred to as the utilization feedback.

FIG. 8 further shows an ERROR amount that corresponds to a difference between the sensed temperature of the sensor and the desired temperature (T-trip). This ERROR amount may be used as a feedback signal in the testing apparatus 310 to control the throttling amount. If the ERROR is significant, then a significant throttle amount may be applied. However, if the ERROR is small, then a smaller throttle amount may be applied. Stated differently, in the dynamic mode the amount of throttling may be based on the magnitude of error. Accordingly, embodiments of the present invention may utilize the ERROR to determine how far the sensed temperature is from the target temperature and may use the ERROR to determine which direction (i.e., decreasing throttle or increasing throttle) the throttle is changing. The sensitivity of the throttling and the amount of throttling may be dependent on this error amount. The dynamic mode thereby acts a closed-loop feedback control system.

Figure 9:
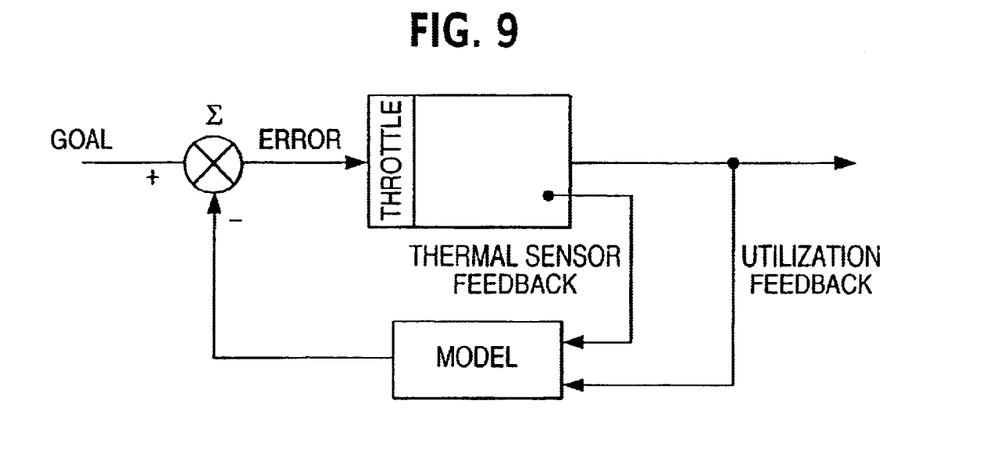
FIG. 9 is a block diagram of an integrated chipset that operates as a closed-loop feedback control system according to an example embodiment of the present invention.

FIG. 9 illustrates an integrated chipset that operates as a closed-loop feedback control system according to an example embodiment of the present invention. Other embodiments and configurations are also within the scope of the present invention. As shown, a thermal sensor feedback and an utilization feedback may be fed back from the chipset and compared against a model (i.e., desired values) to produce an error signal that may be used to dynamically adjust the throttle values. In this figure, the thermal sensor and utilization are used as feedback signals from the chipset. The resulting error signal shows how the throttling effects the operation. The error may be used to control the throttles of the chipset to keep within goals. Software may be used to implement the closed-loop feedback control system as an algorithm.

In at least one embodiment, on a periodic basis (i.e. the sampling time), the algorithm may read and store a new temperature $T_N$. The algorithm may further calculate a distance from the target temperature $T_T$ and calculate the slope of the temperature as $(T_N-T_{N-1})$. The algorithm may use a known thermal equation (ACPI) to adjust the throttles. This equation may be $\Delta P(\%) =_{13} TC1^*(T_N-T_{N-1}) +_{13} TC2^* (T_N-T_T)$. The thermal constants _TC1 and _TC2 may have been derived from profiling the platform to characterize its response.

Filtering may be accomplished by using performance counters, chipset observation architecture (OA) counters and memory bandwidth counter and other utilization/demand detection mechanisms. The apparatus may determine if there is an interface that is more significantly active than others. In such a case, only the throttle of that interface causing the problem may be throttled. Furthermore, throttling may be released only after $T_N \leq (T_T - T_{HYST})$ and all throttles are at 100%.

Accordingly, the power management control may use an on-die thermal sensor and control logic to affect a closed-loop feedback control system that effects the thermal management of an integrated chipset. This may keep the integrated chipset (with multiple independent/dependent functional units) from exceeding the recommended operating temperatures. This may provide maximum performance while maintaining the integrated chipset within the thermal budget. The combined feedback information about bandwidth utilization and demand may determine which functional unit is directly causing the thermal condition.

The methodologies described above may be provided within software (or software routines) provided in the testing apparatus 310 or other device. The mechanism, algorithm and/or routine may also be provided on a program storage device (such as a disk for example) that is readable by a machine (such as a computer system) and include a program of instructions that are executable by the machine to perform the methodology, algorithm and/or routine.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of obtaining throttle settings of a system, said method comprising:

applying a first bandwidth to a first area of said system;

sensing a temperature of said first area of said system using a first thermal sensor provided in the first area; and after receiving an indication of the sensed temperature of the first area from the first thermal sensor, obtaining a first throttle setting based on at least the received sensed temperature of said first thermal sensor.

2. The method of claim 1, wherein said first throttle setting is obtained by increasing said first bandwidth applied to said first area of said system if said sensed temperature of said first thermal sensor is below a predetermined temperature.

3. The method of claim 1, wherein said first throttle setting is obtained by decreasing said first bandwidth applied to said first area if said sensed temperature of said first thermal sensor is above a predetermined temperature.

4. The method of claim 1, wherein said system comprises a chipset and said first area comprises an interface of said chipset.

5. The method of claim 1, wherein said first throttle setting is obtained by using a closed-loop feedback control system.

6. The method of claim 5, wherein said closed-loop feedback control system includes one of thermal sensor feedback and utilization feedback.

7. The method of claim 5, wherein the closed-loop feedback control system utilizes an indication of temperature as feedback.

8. The method of claim 1, wherein the first throttle setting is obtained based on a magnitude that said sensed temperature of the first thermal sensor is from a desired temperature.

9. The method of claim 1, wherein said first throttle setting is obtained based on said first bandwidth applied to said first area of said system.

10. The method of claim 1, wherein obtaining said first throttle setting comprises detecting a difference of said sensed temperature of the first thermal sensor from a desired temperature to determine an error, and adjusting said first bandwidth applied to said first area based on said error.

11. The method of claim 1, further comprising:

applying a second bandwidth to a second area of said system;

sensing a temperature at said second area of said system; and obtaining a second throttle setting based on at least a sensed temperature of said second area.

12. The method of claim 11, wherein said first throttle setting is obtained by applying a third bandwidth to said first area of said system, applying a fourth bandwidth to said second area of said system and comparing said sensed temperature at said first area with a predetermined temperature.

13. The method of claim 11, wherein said second throttle setting is obtained by applying a third bandwidth to said first area of said system, applying a fourth bandwidth to said second area of said system and comparing said sensed temperature at said second area with a predetermined temperature.

14. An apparatus for obtaining throttle settings of a system, said apparatus comprising:

a first thermal sensor to be provided in a first area of said system and to provide a sensed temperature of the first area;

a bandwidth generating device to couple to said system and apply a first bandwidth to said first area of said system; and a monitoring system to couple to said first thermal sensor and to said bandwidth generating device, the monitoring system to receive an indication of the sensed temperature of the first area from the first thermal sensor, said monitoring system to obtain a first throttle setting of said system based on at least the received sensed temperature of said first thermal sensor.

15. The apparatus of claim 14, wherein said system comprises a chipset and said first area comprises an interface of said chipset.

16. The apparatus of claim 15, wherein the first thermal sensor comprises an on-die sensor.

17. The apparatus of claim 14, wherein said monitoring system monitors the received sensed temperature of said first thermal sensor while said bandwidth generating device is applying said first bandwidth to said first area.

18. The apparatus of claim 17, wherein said monitoring system increases said first bandwidth of said bandwidth generating device if said received sensed temperature is below a predetermined temperature.

19. The apparatus of claim 17, wherein said monitoring system decreases said first bandwidth of said bandwidth generating device if said received sensed temperature is above a predetermined temperature.

20. The apparatus of claim 14, wherein said first throttle setting is obtained using a closed-loop feedback control system.

21. The apparatus of claim 20, wherein said closed-loop feedback control system includes one of thermal sensor feedback and utilization feedback.

22. The apparatus of claim 20, wherein the closed-loop feedback control system utilizes an indication of temperature as feedback.

23. The apparatus of claim 14, wherein said first throttle setting is obtained based on a magnitude that said received sensed temperature is from a desired temperature.

24. The apparatus of claim 14, wherein said first throttle setting is obtained based on said first bandwidth applied to said first area of said system.

25. The apparatus of claim 14, wherein said monitoring system includes an en-or detection mechanism to detect a difference of the received sensed temperature of said first thermal sensor from a desired temperature and to produce an error signal, and a feedback mechanism to adjust said first bandwidth applied by said bandwidth generating device based on said error signal.

26. The apparatus of claim 14, further comprising:
a second thermal sensor to be provided in a second area of said system and to provide a sensed temperature at the second area, wherein said bandwidth generating device applies a second bandwidth to said second area of said system.

27. The apparatus of claim 26, wherein said monitoring system couples to said second thermal sensor and receives an indication of the sensed temperature at said second area from said second thermal sensor, said monitoring system obtains a second throttle setting based on at least said received sensed temperature of said second thermal sensor.

28. A program storage device readable by machine, tangibly embodying a program of instructions executable by the machine to perform a method of obtaining a throttle setting of a system, said method comprising:
applying a bandwidth to an area of said system;
receiving an indication of a sensed temperature of said area of said system from a thermal sensor provided in the area of the system; and
after receiving the indication of the sensed temperature of the area of the system, obtaining a throttle setting based on at toast the received sensed temperature of said thermal sensor.

29. The program storage device of claim 28, wherein said throttle setting is obtained by increasing said bandwidth applied to said area of said system if said sensed temperature of said area thermal sensor is below a predetermined temperature.

30. The program storage device of claim 28, wherein said throttle setting is obtained by decreasing said bandwidth applied to said area if said sensed temperature of said thermal sensor is above a predetermined temperature.

31. The program storage device of claim 28, wherein obtaining said throttle setting comprises detecting a difference of said sensed temperature of the thermal sensor from a desired temperature to determine an error, and adjusting said bandwidth applied to said area based on said error.

32. A method comprising:
applying a first bandwidth to a first area of a system;
sensing a temperature of the first area of the system using a thermal sensor provided in the first area;
indicating the sensed temperature of the first area from the thermal sensor to a monitoring system; and
determining a throttle setting for the first area based on at least the sensed temperature indicated to the monitoring system.

33. The method of claim 32, further comprising programming the determined throttle setting into one of a throttle register and a control program.

34. The method of claim 32, further comprising:
applying a second bandwidth to a second area of the system;
sensing a temperature at the second area of the system using another thermal sensor;
indicating the sensed temperature to the monitoring system; and
determining a throttle setting for the second area based on the sensed temperature indicated to the monitoring system.

35. An apparatus comprising:
a first thermal sensor to sense a temperature of a first area of a system and to provide a first thermal feedback signal based on the sensed temperature of the first area;
a second thermal sensor to sense a temperature of a second area of the system and to provide a second thermal feedback signal based on the sensed temperature of the second area; and
a monitoring system to receive the first thermal feedback signal and to receive the second thermal feedback signal, the monitoring system to obtain a first throttle setting relative to the first area based on the first thermal feedback signal and to obtain a second throttle setting relative to the second area based on the second thermal feedback signal.

36. The apparatus of claim 35, further comprising a bandwidth generating device to apply a first bandwidth to the first area of said system of said system and to apply a second bandwidth to the second area of the system.

37. The apparatus of claim 35, wherein the apparatus comprises a chipset and the first thermal sensor comprises an on-die sensor and the second thermal sensor comprises a separate on-die sensor.

38. A Method of obtaining throttle settings of a system, said method comprising:
applying a first bandwidth to a first area of the system;
applying a second bandwidth to a second area of the system;
sensing a temperature at the first area of the system;
sensing a temperature at the second area of the system;
obtaining a first throttle setting based on at least a sensed temperature of said first area; and
obtaining a second throttle setting based on at least sensed temperature of said second area.

* * * * *

UNITED STATES PATENT AND TRADEMARK OFFICE
CERTIFICATE OF CORRECTION

PATENT NO. : 6,701,272 B2
DATED : March 2, 2004
INVENTOR(S) : Barnes Cooper et al.

It is certified that error appears in the above-identified patent and that said Letters Patent is hereby corrected as shown below:

Column 13,
Line 5, "an en-or detection mechanism" should be -- an error detection mechanism --
Line 34, "on at toast" should be -- on at least --

Column 14,
Line 36, "the first area of said system of said system" should be -- the first area of said system --
Line 42, "38. A Method" should be -- 38. A method --
Lines 52-53, "at least sensed" should be -- at least a sensed --

Signed and Sealed this

Third Day of May, 2005

JON W. DUDAS
*Director of the United States Patent and Trademark Office*